United States Patent
O'Neill

(10) Patent No.: US 8,537,987 B2
(45) Date of Patent: *Sep. 17, 2013

(54) BROADCASTING VOICEMAIL REPLIES

(75) Inventor: David J. O'Neill, Falls Church, VA (US)

(73) Assignee: Verizon Business Global LLC, Basking Ridge, NJ (US)

(*) Notice: Subject to any disclaimer, the term of this patent is extended or adjusted under 35 U.S.C. 154(b) by 151 days.

This patent is subject to a terminal disclaimer.

(21) Appl. No.: 13/178,708

(22) Filed: Jul. 8, 2011

(65) Prior Publication Data

US 2011/0261934 A1   Oct. 27, 2011

Related U.S. Application Data

(63) Continuation of application No. 11/274,508, filed on Nov. 16, 2005, now Pat. No. 7,978,830.

(51) Int. Cl.
*H04M 1/64* (2006.01)

(52) U.S. Cl.
USPC .................................. 379/88.25; 379/88.14

(58) Field of Classification Search
USPC ........................................ 379/88.22–88.25
See application file for complete search history.

(56) References Cited

U.S. PATENT DOCUMENTS

| | | | |
|---|---|---|---|
| 4,580,012 A | | 4/1986 | Matthews et al. |
| 5,568,540 A | * | 10/1996 | Greco et al. ............... 379/88.25 |
| 6,021,181 A | | 2/2000 | Miner et al. |
| 6,087,956 A | | 7/2000 | Helferich |
| 6,097,791 A | | 8/2000 | Ladd et al. |
| 6,212,550 B1 | | 4/2001 | Segur |
| 6,335,928 B1 | | 1/2002 | Herrmann et al. |
| 6,370,375 B1 | | 4/2002 | Shively |
| 6,438,215 B1 | | 8/2002 | Skladman et al. |
| 6,438,217 B1 | | 8/2002 | Huna |
| 6,442,243 B1 | | 8/2002 | Valco et al. |
| 6,442,250 B1 | | 8/2002 | Troen-Krasnow et al. |
| 6,760,412 B1 | | 7/2004 | Loucks |
| 6,882,708 B1 | | 4/2005 | Bedingfield et al. |
| 6,917,806 B2 | | 7/2005 | Chng et al. |
| 7,372,947 B1 | | 5/2008 | Messmer |

* cited by examiner

*Primary Examiner* — Simon Sing

(57) ABSTRACT

A messaging device may include a memory configured to store a first message from a first caller and intended for a called party and to store information identifying a group that includes a number of broadcast parties that include the first caller. The messaging device may include a processor configured to receive a reply message from the called party and to broadcast the reply message to at least a subset of the group.

32 Claims, 17 Drawing Sheets

| | IDENTIFICATION 310 | NAME 320 | ASSOCIATION 330 | LOCATION 340 | FORMAT 350 |
|---|---|---|---|---|---|
| FIRST ENTRY 302 | 5551234567 | ROBERT JONES | BOOK CLUB | FAIRFAX, VA | PSTN |
| SECOND ENTRY 304 | 191.55.54.255 | JANE SMITH | BOOK CLUB | FAIRFAX, VA | IP |
| THIRD ENTRY 306 | LEE@MCI.COM | BILL LEE | OFFICE | FAIRFAX, VA | EMAIL |
| | ... | | | | |
| | | | | | |

| | ID 612 | NAME 614 | ASSOC 616 | LOC 618 | FMT 620 |
|---|---|---|---|---|---|
| 1 | 5551234567 | ROBERT JONES | BOOK CLUB | FAIRFAX, VA | PSTN |
| 2 | 5552345678 | JANE SMITH | BOOK CLUB | FAIRFAX, VA | PSTN |
| 3 | 5553456789 | BILL LEE | OFFICE | FAIRFAX, VA | PSTN |
| | 5556667777 | SAM SLADE | GOLF | BOWIE, MD | PSTN |

FIG. 6B

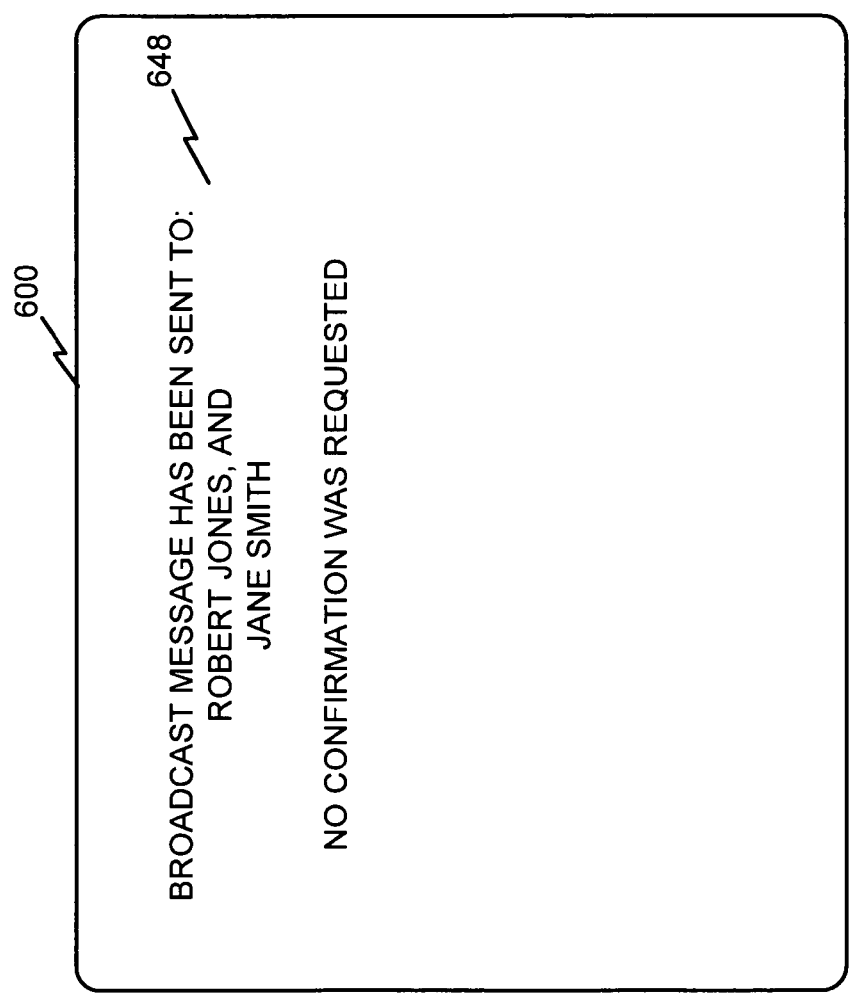

| | NAME | STATUS |
|---|---|---|
| 1 | ROBERT JONES | SELECTED |
| 2 | JANE SMITH | SELECTED |
| 3 | JACK BLACK | NOT SELECTED |
| | | |

BOOK CLUB 658

BROADCASTING VOICEMAIL REPLIES

CROSS-REFERENCE TO RELATED APPLICATIONS

This is a continuation of prior co-pending U.S. patent application Ser. No. 11/274,508, filed on Nov. 16, 2005, titled BROADCASTING VOICEMAIL REPLIES the contents of which are expressly incorporated herein by reference. Benefits under 35 U.S.C. §120 are hereby claimed.

FIELD OF THE INVENTION

Implementations consistent with the principles of the invention relate generally to communication services and, more particularly, to voice messaging services and the translating of replies to voicemail messages.

BACKGROUND OF THE INVENTION

Voicemail systems may receive, store and provide voicemail messages for subscribers of a voicemail service. A "subscriber" is typically a person that has a relationship with the provider of the voicemail service. For example, the voicemail service may be provided by a local telephone company through which a subscriber receives telephone service.

Voicemail services may have certain shortcomings. One such shortcoming, may occur when a subscriber wishes to retrieve his/her messages. For example, when a subscriber wishes to retrieve his/her messages, the subscriber typically calls a telephone number associated with the voicemail service and retrieves each message in the order in which the messages were stored. Therefore, the subscriber must listen to at least a portion of each message to determine who has left the message. This type of message retrieval system may be time consuming to use when the subscriber needs to access a large number of stored messages.

Another shortcoming associated with voicemail systems may occur when the subscriber responds to voicemail messages by, for example, sending a reply to a calling party. The subscriber may have to respond to each message individually even when callers are associated with each other, such as members of a sports team, employees of a department within a corporation, classmates, etc., and/or where the subject matter of the stored messages is very similar, such as when multiple messages pertain to the same topic.

Voicemail users may benefit from devices and/or techniques that let users interact with voicemail systems more efficiently.

SUMMARY OF THE INVENTION

According to one aspect consistent with the principles of the invention, a method is provided. The method may include storing a message associated with a subscriber of a voicemail system. The method may include providing information about the stored message to the subscriber. The method may include receiving a message from the subscriber in response to the stored message. The method may include receiving an input from the subscriber, where the input represents a group of parties. The method may include sending the message to the group of parties as a broadcast message.

According to another aspect consistent with the principles of the invention, a messaging device is provided. The messaging device may include a memory configured to store a first message from a first caller and intended for a called party and to store information identifying a group that includes a group of broadcast parties that include the first caller. The messaging device may include a processor configured to receive a reply message from the called party and to broadcast the reply message to at least a subset of the group.

According to a further aspect consistent with the principles of the invention, a method is provided. The method may include notifying a called party about a group of stored messages received from a group of calling parties. The method may include making information about at least one of the group of messages available to the called party in response to a first input. The method may include recording a new broadcast message or retrieving a stored broadcast message on behalf of the called party in response to a second input. The method may include sending the new broadcast message or the retrieved broadcast message to at least a subset of the group of calling parties on behalf of the called party based on a third input.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 3 illustrates an exemplary database that may be associated with the directory server of FIG. 1 in an implementation consistent with the principles of the invention;

FIGS. 6A-L, illustrate exemplary aspects of a user's interaction with VM system 140 consistent with the principles of the invention.

DETAILED DESCRIPTION

The following detailed description of implementations consistent with the principles of the invention refers to the accompanying drawings. The same reference numbers in different drawings may identify the same or similar elements. Also, the following detailed description does not limit the invention. Instead, the scope of the invention is defined by the appended claims and their equivalents.

Exemplary System

Figure 1:
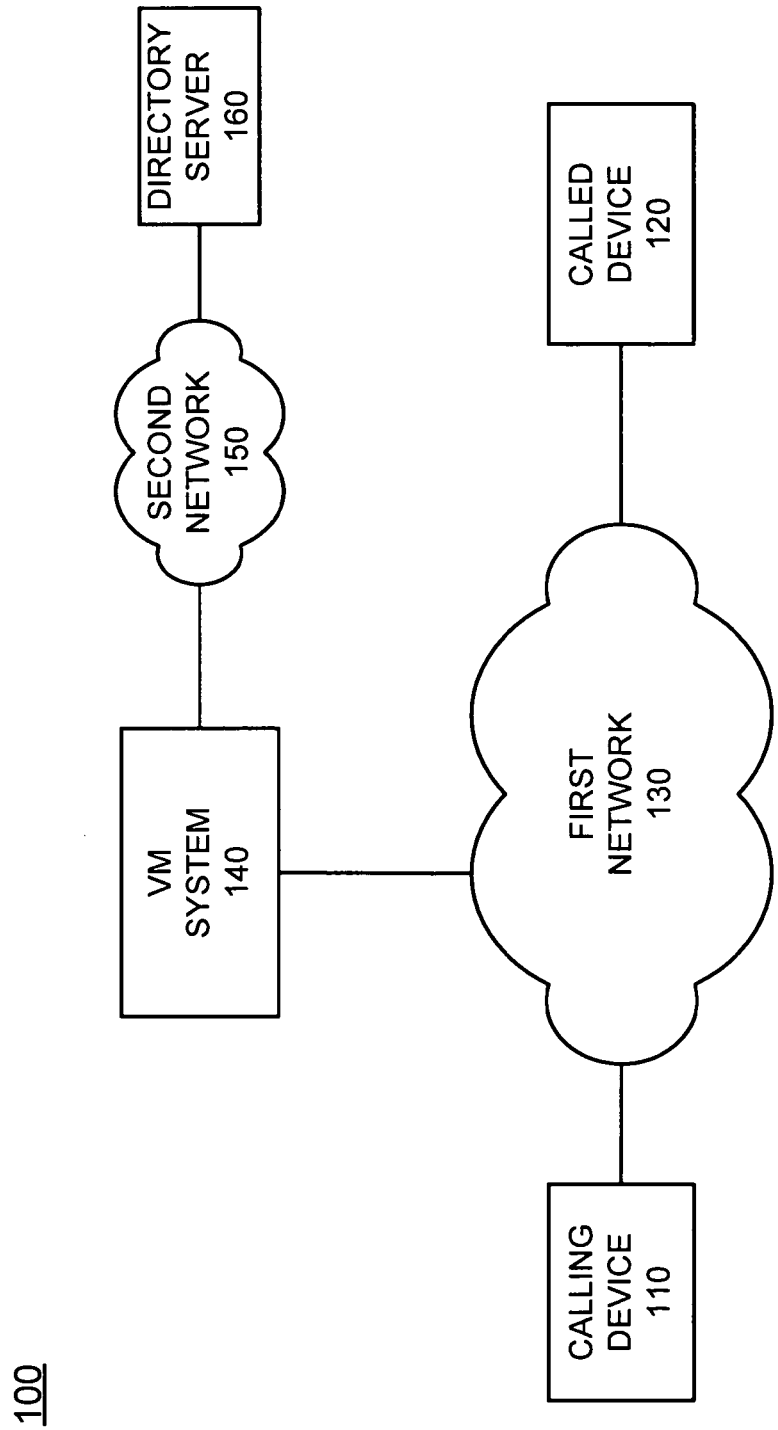
FIG. 1 illustrates an exemplary system in which methods and systems consistent with the principles of the invention may be implemented.

FIG. 1 illustrates an exemplary system in which methods and systems consistent with the invention may be implemented. Referring to FIG. 1, system 100 may include calling device 110, called device 120 first network 110, second network 150, voicemail (VM) system 140 and directory server 160. The number of elements and networks illustrated in FIG. 1 is provided for simplicity. In practice, a typical system could include more or fewer elements and networks than illustrated in FIG. 1.

Calling device 110 and called device 120 may each include any device or combination of devices capable of transmitting voice signals to a network, such as first network 130. In one implementation, calling device 110 and called device 120 may each include any type of telephone system/device, such as a plain old telephone system (POTS) telephone, a session initiation protocol (SIP) telephone, and/or a wireless telephone device. In another implementation, calling device 110 and called device 120 may each include a type of computer system, such as a mainframe, minicomputer, personal computer, a laptop, personal digital assistant (PDA), or the like. Calling device 110 and called device 120 may connect to first network 130 via any type of connection, such as wired, wireless, or optical connections.

In implementations described herein, calling device 110 may leave a voicemail message for a user, or subscriber, that is associated with called device 120. "Voicemail message", as used herein, may refer to substantially any type of message that may be associated with calling device 110 and/or called device 120. For example, a voicemail message may include a conventional voicemail message such as those associated with Public Switched Telephone Network (PSTN) phones. In addition, a voicemail message may include messages that contain digitized audio, digital images, digital video and/or text.

First network 130 and second network 150 may each include a local area network (LAN), a metropolitan area network (MAN), a wide area network (WAN), a telephone network, such as the PSTN, an intranet, the Internet and/or a combination of networks. In one implementation consistent with the invention, first network 130 may be implemented as a combined network that includes a PSTN, the Internet and/or a long distance telephone network. In this implementation, first network 130 may include one or more end offices, central offices (COs) and/or associated switches. First network 130 may also include one or more tandem switches, such as a Class 4 switch that may act as a point of presence for interfacing to a long distance network, etc.

In an exemplary implementation consistent with the principles of the invention, second network 150 may include a LAN and/or a WAN that connects VM system 140 to directory server 160. In alternative implementations, VM system 140 may connect directly to directory server 160.

VM system 140 may include one or more network devices (e.g., voicemail servers/platforms) that perform voicemail services, such as receiving, storing, and providing voicemail messages to subscribers. For example, VM system 140 may include an automated response unit (ARU) and automatic call distributor (ACD) that provide a greeting, to a caller and prompt the caller to leave a message. VM system 140 may be configured to store substantially any number of messages for a subscriber, and the stored messages may be associated with substantially any number of calling parties.

Implementations consistent with the principles of the invention use VM system 140 that may be configured to provide a broadcast message capability to subscribers of VM system 140. For example, a subscriber may interact with VM system 140 to send a broadcast message to substantially any number of calling parties or non-calling parties.

As used herein, "broadcast message" or "broadcast reply" refers to any message that can be distributed to multiple destinations at the same time or substantially the same time via a single act, or series of acts. Broadcast messages may include voice, video, images and/or text.

As used herein, "calling party" refers to any party associated with a voicemail message that is stored in VM system 140. For example, a calling party may have left a stored voicemail message that is intended for a called party. A calling party may be a subscriber of VM system 140 and/or a calling party may not be a subscriber of VM system 140.

As used herein, "non-calling party" refers to any party that has not left a stored voicemail message in VM system 140. A non-calling party may have information identifying the on-calling party stored in a database associated with VM system 140, even though no stored voicemail messages may be associated with the non-calling party. Non-calling parties may be subscribers of VM system and/or non-calling parties may not be subscribers of VM system 140.

As used herein, "subscriber" refers to any party that is associated with VM system 140. For example, a called party may be a subscriber of VM system 140 by way of a voicemail account on VM system 140. Calling parties and/or non-calling parties may also be subscribers of VM system 140 if the calling parties have, for example, accounts on VM system 140.

Assume that a first caller leaves a first message and a second caller leaves a second message. The subscriber may play the first and/or second message via called device 120. The subscriber may send a broadcast message to the first caller and the second caller using a single series of actions to generate and send the broadcast message, as described in more detail below. The broadcast message may operate as reply to the first message and/or the second message.

Broadcast messages may be sent in one or more formats, such as by sending a first format to a first calling party and a second format to a second calling party. Assume that a PSTN caller leaves a message for a subscriber. The subscriber may send a broadcast reply to the caller in a PSTN compatible format while sending an IP compatible broadcast reply to another party that may, or may not, be associated with the caller. Broadcast messages let a subscriber efficiently respond to substantially any number of messages associated with his/her voicemail account.

Directory server 160 may include any device capable of storing information about an identity of calling device 110 and/or a party. For example, directory server 160 may include one or more servers that store information regarding various calling party identifiers, such as telephone numbers, fax numbers, IP addresses, SIP addresses, instant messaging (IM) addresses and/or email addresses. For example, directory server 160 may include a database that lists telephone numbers across the United States and, optionally, outside the United States, and user names associated with the respective telephone numbers. Directory server 160 may also include other databases that store telephone numbers, names, and/or other identifying information associated with telephone numbers, names, and/or other identifying information associated with calling parties and/or non-calling parties, as described in more detail below.

Exemplary Configuration for Voicemail System

Figure 2:
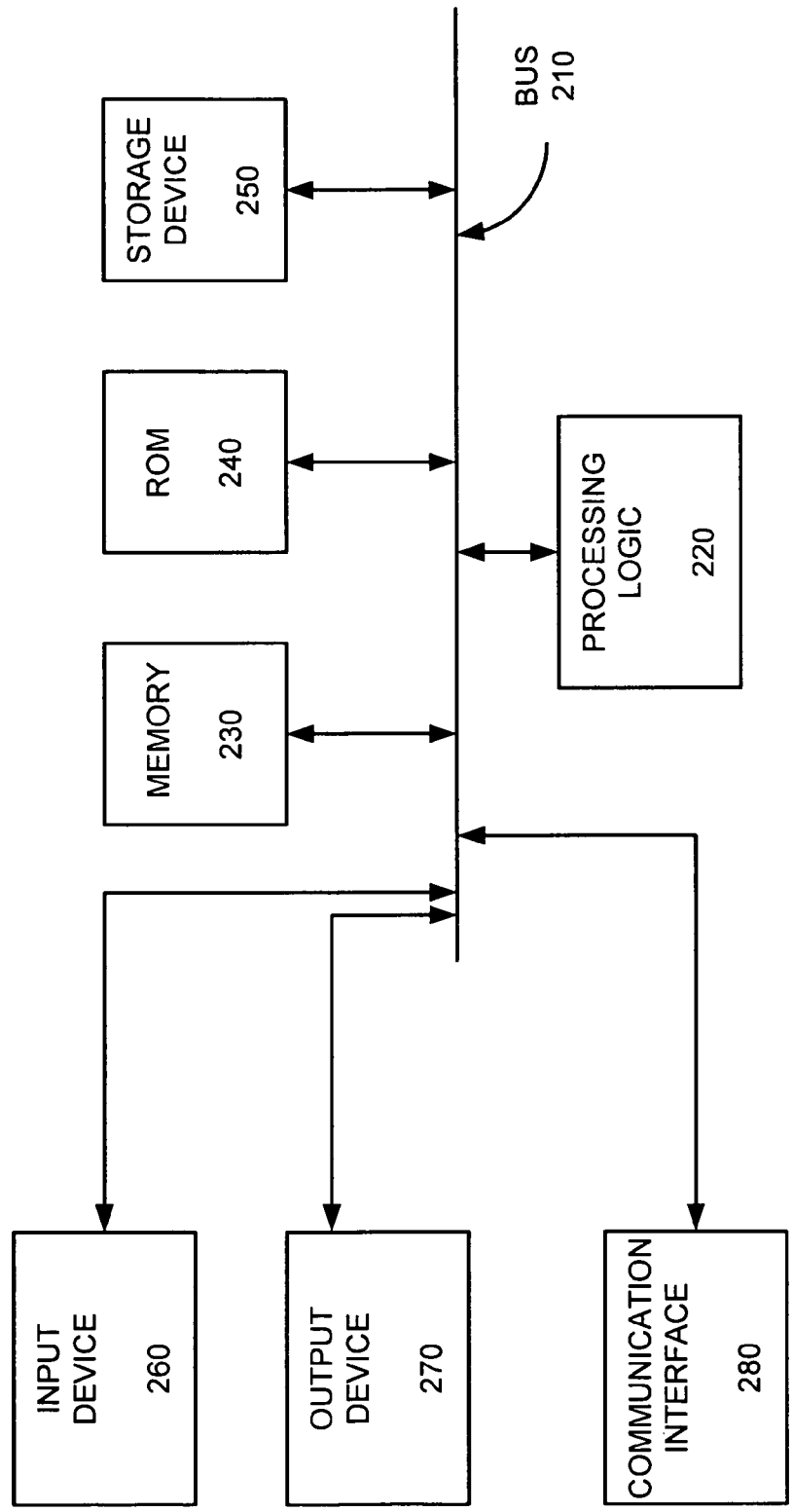
FIG. 2 illustrates an exemplary configuration of the voicemail system of FIG. 1 in an implementation consistent with the principles of the invention.

FIG. 2 illustrates an exemplary configuration of VM system 140 in an implementation consistent with the invention. Directory server 160 may be similarly configured. Referring to FIG. 2, VM system 140 may include a bus 210, processing logic 220, a memory 230, a read only memory (ROM) 240, a storage device 250, an input device 260, an output device 270, and a communication interface 280. It will be appreciated that VM system 140 may include other components (not shown) that aid in receiving, transmitting, and/or processing voicemail messages.

Bus 210 may permit communication among the components of VM system 140. Processing logic 220 may include any type of processor, or microprocessor, that interprets and executes instructions. In other implementations, processing logic 220 may be implemented as or may include an application specific integrated circuit (ASIC), field programmable gate array (FPGA), or the like. Memory 230 may include a random access memory (RAM) or another type of dynamic storage device that stores information and instructions for execution by processing logic 220. ROM 240 may include a ROM device and/or another type of static storage device that stores static information and instructions for processing logic 220. Storage device 250 may include a magnetic or optical recording medium and its corresponding drive for storing information and/or instructions.

Input device 260 may include a device that permits an operator to input information to VM system 140, such as a keyboard, a keypad, a mouse, a pen, a microphone, one or more biometric mechanisms, and the like. Output device 270 may include a device that outputs information to the operator, including a display, a printer, a speaker, etc.

Communication interface 280 may include any transceiver-like mechanism that enables VM system 140 to communicate with other devices and/or systems. For example, communication interface 280 may include mechanisms for communicating with another device or system via a network, such as first network 130 or second network 150.

VM system 140, consistent with the invention, may perform voicemail services, as described in detail below. VM system 140 may perform these and other services in response to processing logic 220 executing software instructions contained in a computer-readable medium, such as memory 230. A computer-readable medium may be defined as one or more memory devices and/or carrier waves. The software instructions may be read into memory 230 from another computer-readable medium, such as data storage device 250, or from another device via communication interface 280. The software instructions contained in memory 230 may cause processing logic 220 to perform processes that will be described later. Alternatively, hardwired circuitry may be used in place of or in combination with software instructions to implement processes consistent with the principles of the invention. Thus, systems and methods consistent with the invention are not limited to any specific combination of hardware circuitry and software.

Exemplary Database

VM system 140 may interact with directory server 160 to receive voicemail messages associated with a broadcast party. "Broadcast party," as used herein, refers to any party that can receive a broadcast message. Broadcast parties may be calling parties, non-calling parties, subscribers, and/or non-subscribers. Broadcast parties may be associated with a database that stores information on behalf of a subscriber, such as a called party. The database may access broadcast party information when a called party is accessing a stored voicemail message and/or composing/sending broadcast messages to recipients.

FIG. 3 illustrates an exemplary database 300 that may be associated with directory server 160 in an implementation consistent with the principles of the invention. Directory server 160 may operate with one or more databases 300 to process inbound calls when interacting with VM system 140. Database 300 may be stored in, for example, a storage device within directory server 160 or may be located externally from directory server 160. In alternative implementations, database 300 and/or directory server 160 may be stored in VM system 140.

Referring to FIG. 3, database 300 may include an identification field 310, a name field 320, an association field 330, a location field 340 and a format field 350. It should be understood that database 300 may include additional and/or different fields (not shown) that provide information associated with a telephone number and/or another identifier associated with a broadcast party.

In one implementation, a broadcast party may be associated with more than one called party in database 300. Entries within database 300 may be arranged or grouped according to one or more criteria. For example, entries may be organized in rows and/or columns to facilitate interpretation of information stored in database 300 by an operator. Entries may be denoted as first entry 302, second entry 304 and third entry 306.

Identification field 310 may store an identifier associated with a user device, such as calling device 110. The identifier may include, for example, any information that can be used to identify a device and/or a user of a device on a network. Implementations consistent with the principles of the invention may use IP addresses, email addresses, telephone numbers, SIP user names, etc., as entries in identification field 310. For example, an identifier may include a unique group of characters, such as a 10 digit telephone number that is associated with a user device (e.g., calling device 110).

Name field 320 may store information associated with the identifier used in identification field 310, such as the name of the party to whom the corresponding identifier in identification field 310 has been registered, or assigned to, by a service provider, such as a telephone company, Internet service provider (ISP), etc. For example, referring to FIG. 3, the telephone number 555-123-4567 in first entry 302 corresponds to the name Robert Jones. In contrast, second entry 304 in database 300 corresponds to an Internet address associated with Jane Smith, and third entry 306 in database 300 corresponds to an email address associated with Bill Lee.

Association field 330 may include any information for identifying entries in database 300 and/or for associating a number of database 300 entries together. For example, first entry 302 and second entry 304 may be associated with a book club of which a subscriber, e.g., recipient of a voicemail message, may be a member. Association field 330 may let the subscriber send a broadcast message, such as a reply to a voicemail message, to a subset of entries associated with the book club or to all entries associated with the book club. Assume that Robert Jones leaves a voicemail message for the subscriber regarding a book that will be read at an upcoming club meeting. The subscriber may notify other members of the book club about the book by sending a broadcast message to every entry that includes "book club" in association field 330.

Location field 340 may store geographic information associated with a name in name field 320 and/or an identifier in identification field 310. Geographic information may be associated with a local region, such as a neighborhood or city, or a non local region, such as a neighboring state and/or country. Geographic information may provide a subscriber with an additional way to identify calling parties. For example, if Jane Smith leaves a message for a subscriber about a city council meeting for the city of Fairfax, the subscriber may send a broadcast message to any entry 302, 304, 306 that includes "Fairfax" in location field 340. Location field 340 may facilitate composing and sending broadcast messages to a number of recipients based on common criteria, such as a city of residence.

Format field 350 may include information that identifies a communication format, such as a communication and/or networking protocol, that can be used to send a broadcast message from VM system 140 and/or directory server 160 to a caller. For example, format field 350 may include "PSTN" to indicate that Robert Jones should be contacted is a message compatible with a PSTN. In contrast, "IP" may indicate that Jane Smith should be contacted via a message compatible with an IP network. Format field 350 may include multiple entries for a single caller. Multiple entries may cause multiple broadcast messages, in a number of formats, to be sent to the caller. Implementations consistent with the principles of the invention may let a subscriber send a broadcast message to multiple recipients using multiple formats. For example, a broadcast message may be sent to Robert Jones in a PSTN format and to Jane Smith in an IP network format, such as by way of an instant message (IM). In addition, in some implementations, multiple messages may be sent to one (or more) of the recipients in multiple different formats.

Implementations of database 300 may include other fields (not shown), such as a preference field that may include information for identifying one or more communication preferences associated with a caller. For example, a preference field may include entries listed in a hierarchy, where the hierarchy determines an order for contacting the caller. Assume that a preference field includes "PSTN", "pager" and "email" for Robert Jones. When a subscriber sends a broadcast message to Robert Jones, the message may be sent in a PSTN format since PSTN is the first entry. If no acknowledgement is received, such as a receipt confirmation, within a determined time span, a pager compatible message may be sent and then an email message may be sent.

A preference field may also include additional information such as a time-of-day entry. The time-of-day entry may be associated with a broadcast party, such as Robert Jones. The time-of-day entry may be used to specify a time window when a recipient, such as Robert Jones, can be reached via a broadcast message. For example, if Robert Jones is only available to receive broadcast messages from 3:00 PM to 4:00 PM, a time-of-day entry for Robert. Jones may be "3-4 PM." Time-of-day entries may also be used to set a lifetime value for a broadcast message. A lifetime value may determine how long a broadcast message may remain undelivered and/or unread before being deleted. For example, a subscriber may assign a lifetime value of one hour to a broadcast message. If the broadcast message is not read by a recipient within one hour of being sent, the message may be deleted from the recipient's inbox.

Database 300 may be populated using information obtained from a broadcast party and/or a called party. For example, a portion of database 300 may be associated with a called party. The called party may enter information into database 300 on his/her own behalf. For example, the called party may enter information into database 300 about callers that are known to the called party. Information about known callers can be arranged in a format that allows callers to be identified and/or grouped according to criteria provided by the called party. In an alternative implementation, consistent with the principles of the invention, callers may provide information to directory server 160 and/or an operator associated with directory server 160 along with a request that the information be placed in a portion of database 300 that is associated with a called party.

While only one database 300 is described above, it will be appreciated that database 300 may include multiple databases stored locally at directory server 160 and/or stored at different locations accessible by directory server 160 via first network 130 and/or second network 150. Moreover, if a number of directory servers 160 are present, each In other implementations, consistent with the principles of the invention, database 300 may be associated with one or more other devices in system 100. For example, database 300 may be associated with VM system 140 and may be directly accessible by VM system 140. For example, database 300 may be operated and/or maintained by the same entity that operates VMS system 140.

Exemplary Processing

Figure 4:
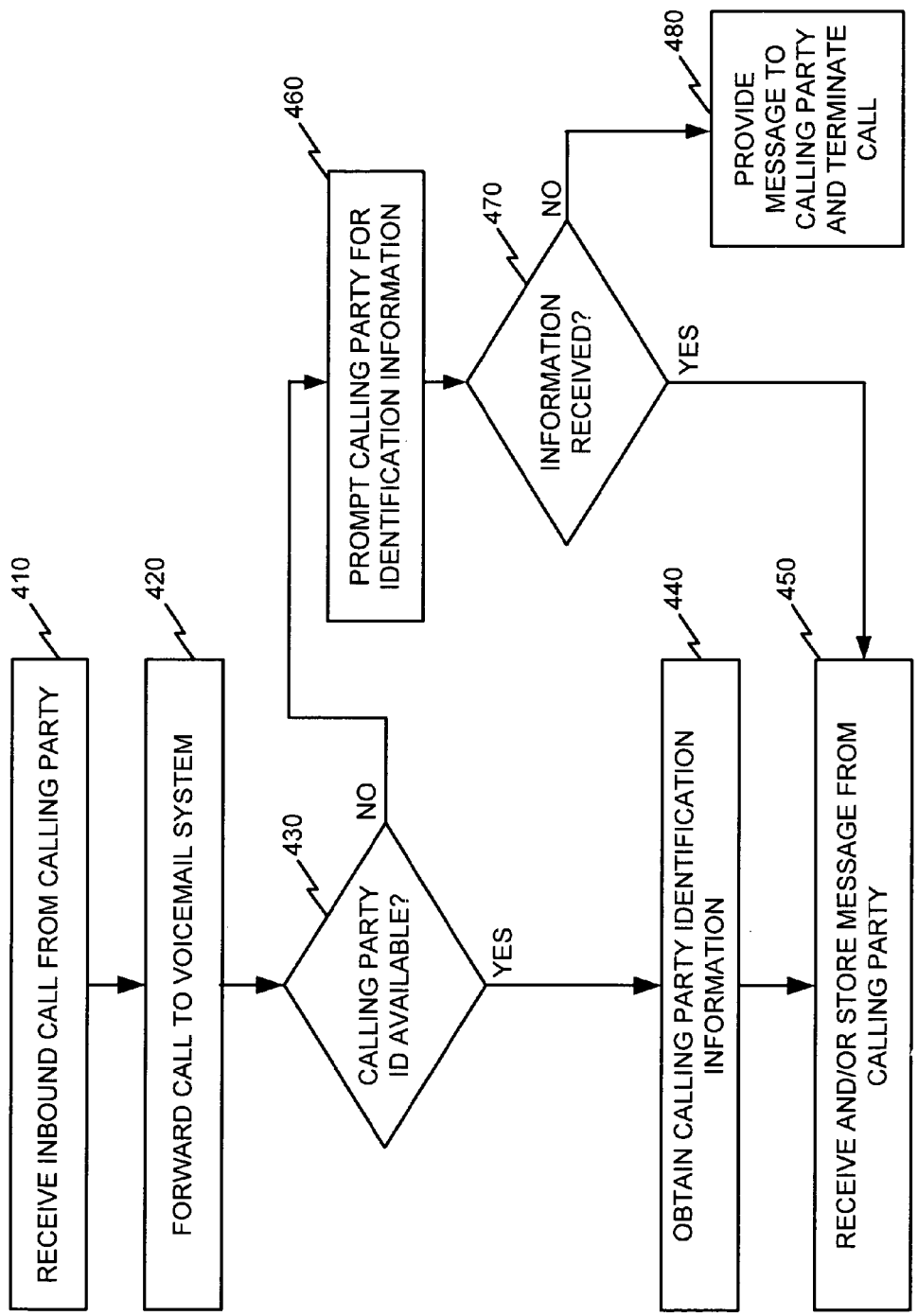
FIG. 4 illustrates an exemplary process for receiving and storing voicemail messages and caller information in an implementation consistent with the principles of the invention.

FIG. 4 illustrates an exemplary process for receiving and storing voicemail messages and caller information in an implementation consistent with the principles of the invention. FIG. 4 is discussed in connection with a PSTN; however, other implementations may employ other protocols and/or network architectures in conjunction with acts similar to those illustrated in FIG. 4. For example, processes similar to those described with respect to FIG. 4 may be implemented in SIP networks, IP networks, etc.

A called party may subscribe to voicemail services provided by VM system 140. A central office (CO) in first network 130 may receive an inbound call from a calling party (act 410). Assume that the called party does not answer the inbound call from the calling party. After a predetermined number of rings without an answer, a CO may forward the inbound call to a messaging system, such as VM system 140 (act 420).

The CO in first network 130 may be provided with a telephone number to which the inbound call is to be forwarded after the predetermined number of rings. For example, an entity associated with VM system 140 may provide a local exchange carrier (LEC) operating the CO in first network 130, to which called device 120 is coupled, with a telephone number associated with VM system 140. In an exemplary implementation, the LEC that forwards the call to VM system 140 may be unaffiliated with the entity that operates VM system 140. That is, VM system 140 may be operated by an entity that provides voicemail services to the subscriber at called device 120, but does not provide local phone service to that subscriber. For example, in some implementations. VM system 140 may be operated by an inter-exchange carrier (IEC) that provides long distance services via first network 130.

Alternatively, VM system 140 may be affiliated with the LEC providing local telephone service to called device 120. In this case, the LEC may forward the call to a switch in its own network that is associated with VM system 140. In each case, the LEC (or other service provider) may configure the appropriate CO in first network 130 to forward calls to the appropriate telephone number after a predetermined number of rings without an answer at called device 120.

VIM system 140 may receive the forwarded call. VM system 140 may determine if identifying information is available for the calling party associated with the forwarded call (act 430). For example, a telephone number associated with a calling party may serve as identifying information for the calling party.

If identification information is available for the calling party, VM system 140 may obtain the identification information (act 440). For example, VM system 140 may perform an automatic number identification (ANI) process to identify an originating telephone number associated with the calling party at calling device 110. Alternatively, another device in system 100, such as a local switch in first network 130, may perform an ANI to identify the originating telephone number and may pass the ANI information to VM system 140 via first network 130. In a data network implementation, such as an IP network, a packet sent from calling device 110 may include identifying information.

After the telephone number associated with the calling party is identified. VM system 140 may perform a lookup using the calling party's telephone number. For example, VM system 140 may forward the calling party's telephone number to directory server 160 and may use this telephone number to identify a name associated with the calling party. As an example, suppose that the identified telephone number is 555-123-4567. In this case, directory server 160 may access database 300 (FIG. 3) and may identify the calling party (or the person to whom the originating telephone number has been assigned) as Robert Jones.

Directory server 160 may maintain a number of databases that can be associated with called parties. For example, directory server 160 may associate a first database with a first called party and a second database with a second called party. Directory server 160 may use a telephone number associated with the called party to identify a database for use with that called party. Assume that a caller places a call to called device 120 and the called party does not answer, VM system 140 and/or directory server 160 may process the called number to determine which database should be accessed. After the proper database is accessed (e.g., database 300), information, such as telephone numbers and/or names, associated with calling parties known to the called party may be used to identify the calling party. The identified calling party information may be used to record an audible prompt that identifies the calling party. The audible prompt may be played to the called party when the called party retrieves stored messages, as described below.

After identifying a name or some other identifier associated with the calling party, directory server 160 may forward the name and/or other identifying information, such as information in association field 330, information in location field 340, and/or information in format field 350, to VM system 140. VM system 140 may, concurrently with identifying the name associated with the calling party, prompt the calling party to leave a message.

VM system 140 may receive and store the voicemail message from the calling party along, with the name associated with the calling party (act 450). For example, VM system 140 may play a pre-recorded message for the calling party that prompts the calling party to leave a message. The calling party may then leave a voicemail message and VM system 140 may store the voicemail message along with the name of the calling party.

Returning to act 430, if identification information, such as a telephone number, is not available for the calling party. VM system 140 may prompt the calling party for identification information (act 460). For example, if a calling party places a call to VM system 140 from a telephone having an unlisted number, no caller ID information may be available to VM system 140. VM system 140 may prompt the calling party to speak his/her name and/or telephone number. VM system 140 may process the spoken response using a speech recognition application.

VM system 140 may determine if the identification information provided by the calling party is sufficient to identify the calling party (act 470). If the identification information received from the calling party is adequate to identify the calling party, process flow may go to act 450 and store a message from the calling party. For example, if VM system 140 can determine the identity of the calling party by processing the spoken response received in act 470, the calling party may be allowed to leave a message for the called party.

In contrast, if the identification information received from the calling party in act 470 cannot be used to determine the identity of the calling party, a message may be provided to the VM system 140 may notify the called party that a stored message is on the system. For example, VM system 140 may transmit a message waiting indicator (MWI) to called device 120. The MWI may be visual, such as a light, text, or image, and/or may be audible. For example, a MWI, consistent with the invention, may include a "stutter tone" that is provided to a user when called device 120 is taken off-hook. This stutter tone may alert the user to the presence of a voicemail message. Other implementations, such as an IP implementation, may display a MWI that includes text and/or images on a computer display.

A party associated with called device 120 may retrieve stored voicemail messages and/or may send broadcast replies, as described in detail below.

Figure 5:
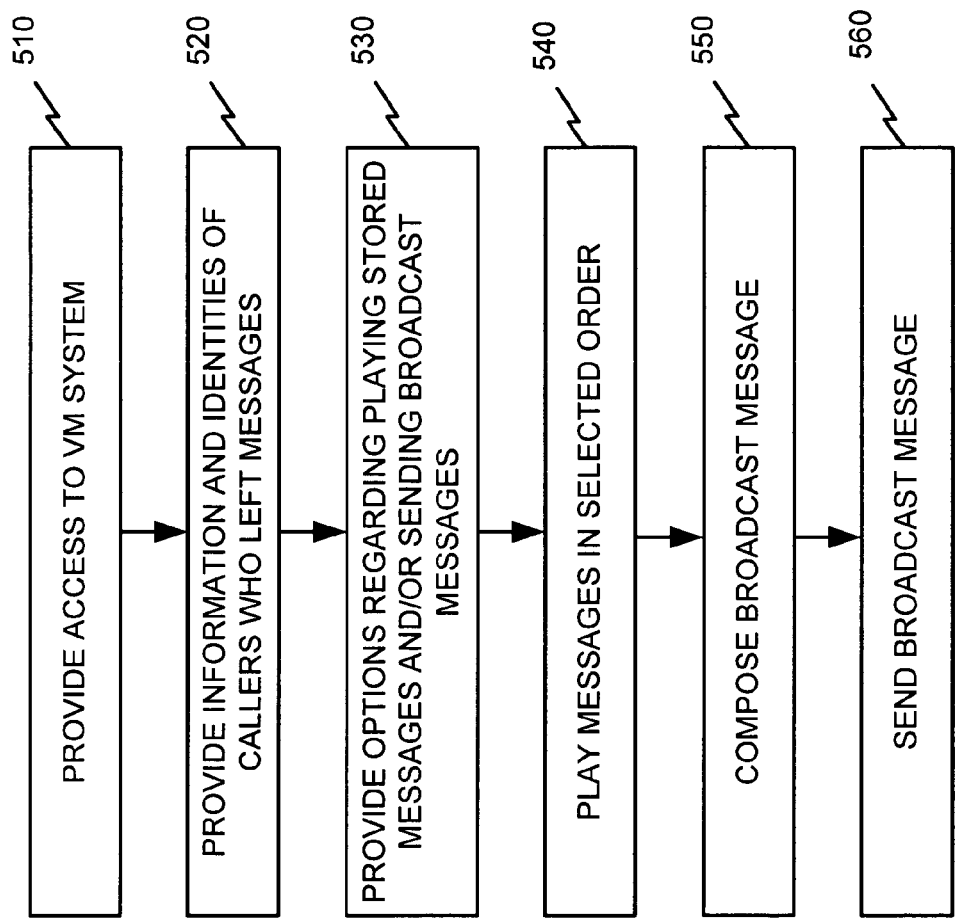
FIG. 5 illustrates an exemplary process associated with retrieving information associated with stored voicemail messages and for retrieving the stored voicemail messages in an implementation consistent with the principles of the invention.

FIG. 5 illustrates an exemplary process associated with retrieving information associated with stored voicemail messages and for retrieving the stored voicemail messages in an implementation consistent with the principles of the invention. Processing may begin after a calling party has left a message for the called party associated with called device 120.

Assume that the called party takes called device 120 off-hook to retrieve his/her messages from VM system 140. The called party, consistent with the invention, may access VM system 140 (act 510). For example, a party at called device 120 may enter a telephone number associated with VM system 140. Alternatively, a party at called device 120 may enter one or more pre-designated characters to retrieve the voicemail messages. Telephone-based implementations may provide the party at called device 120 with information in a spoken format, which can include human generated speech and/or machine generated speech. Other implementations, such as IP-based implementations, may provide information in text and/or spoken formats.

VM system 140 may request an authorization code, such as a user name and/or password, from a subscriber. The authorization code may be used to identify the subscriber before letting the subscriber access the stored voicemail messages associated with calls to called device 120. In an alternative implementation consistent with the invention, VM system 140 may capture the telephone number and/or another identifier, such as an IP address, associated with called device 120 without requesting an authorization code. For example, ANI techniques may be used to capture the telephone number associated with the called device 120. Alternatively, VM system 140 may employ speech recognition software to process spoken responses to capture information associated with called device 120, such as a user name and/or password.

Assume that the called party has established communications with VM system 140 and has been authorized to access VM system 140. Further assume that VM system 140 has stored a number of messages for the called party. For example, VM system 140 may have stored voicemail messages, email messages, and/or video messages for the called party.

VM system 140 may provide information about stored messages and/or the identities of callers associated with those messages tact 520). For example, an introductory message, such as a greeting, a time/date stamp for the message, a length of the message and/or a priority for the message may be provided to the party at called device 120. The greeting may also identify the number and/or type of stored messages that are waiting for the called party. For example, VM system 140 may provide a message to the party at called device 120, such as, "The first stored message is a voicemail message from Jane Smith, the second stored message is video message from Robert Jones," etc. in this manner, the party at called device 120 may quickly determine who has left messages and/or may determine what types of messages are stored on VM system 140.

In some implementations, VM system 140 may provide the party at called device 120 with a visible display identifying the callers who left messages. For example, if called device 120 includes a telephone with a display area and/or a computer display device, VM system 140 may transmit text information to called device 120. The transmitted text information and/or images may include information that lets the called party identify callers who left messages. VM system 140 may also transmit other types of information that are associated with the caller, such as visual information (e.g.; images of the caller) or audible information (e.g., a name and/or affiliation announcement).

VM system 140, consistent with the invention, may also provide options to allow the party at called device 120 to retrieve stored messages and/or send broadcast messages in substantially any order (act 530). For example, VM system 140 may provide a voice menu that allows the called party to select one of the names of the identified callers who left a message. Alternative implementations, such as web-based implementations, may provide for the use of a keyboard and display device and/or a speech recognition interface when called party is selecting the name of an identified caller. For example, VM system 140 may provide the called party with a display that shows information associated with stored messages.

Assume that the called party brings up a display showing stored messages. Further assume that the display presents information about stored messages in a format similar to the arrangement of entries in database 300 of FIG. 3. The called party may select a stored message using information associated with the message. For example, if the called party is accessing stored messages on a PDA, the called party may only wish to answer messages associated with callers capable of receiving, text-based broadcast messages. A format field may be included in the information displayed to the called party to let the called party know that certain callers can receive text based broadcast messages. In still other alternative implementations, VM system 140 may be configured to translate broadcast messages from a first format to a second format where the second format may be compatible with a calling party while the first format may not be compatible with the calling party.

VM system 140 may play the selected caller's message without playing each message that was stored prior to the selected message (act 540). As an example, suppose that VM system 140 provides the names Jane Smith, Robert Jones, Ed Wilson and George Taylor to the called party at called device 120, identifying four parties who left voicemail messages. VM system 140 may provide a voice menu that instructs the called party to voice any one of the identified names to retrieve the corresponding message. For example, VM system 140 may provide a message such as, "Please select a caller to hear the message from that caller." Further assume that the called party at called device 120 wishes to retrieve the message from Ed Wilson before hearing any other message. In this case, the called party may say the name Ed Wilson into called device 120. Voice recognition software at VIM system 140 may recognize the called party's spoken input (i.e., Ed Wilson in this example) and may play Ed Wilson's voicemail message to the called party via called device 120. In this manner, the called party at called device 120 may retrieve stored messages in substantially any order.

In alternative implementations, VM system 140 may prompt the called party at called device 120 to enter one or more inputs via a keypad and/or pointing device on, for example, called device 120 to select a particular message. For example, VM system 140 may provide a textual prompt such as "To hear Jane Smith's message, press 1; to hear Robert Jones' message, press 2, . . . ", etc. In this manner, a called party may retrieve stored messages in his/her desired order, regardless of the order in which the messages were received. Letting the called party retrieve messages out of order may save time with respect to retrieving the stored messages since the called party can choose any message.

Implementations may also let the called party associate priority information with a list of potential calling parties. For example, the called party may specify a priority for each broadcast party (e.g., a calling party) stored in database 300. VIM system 140 may then present a list of names (or the actual stored voicemail messages) to the called party based on the priorities identified in the stored list. For example, suppose that the called party indicates that calls from his/her designated family members have the highest priority. If one of these designated family members leaves a message for the called party, the name of that calling party would be presented first to the called party when the called party retrieves his/her voicemail message.

Priorities, such as those associated with stored messages, may be used by a called party when sending broadcast messages to recipients. For example, assume that stored messages from a first calling party have a first priority and stored messages from a second calling party have a second priority. A called party may associate the first priority and the second priority to recipients of broadcast messages. For example, the called party may compose a broadcast message directed to the first calling party and the second calling party. The called party may send the broadcast message to the first calling via the first priority to and to the second calling party via the second priority. Implementations consistent with the principles of the invention let a called party associate substantially any number of priorities to incoming voicemail messages and/or to outgoing broadcast messages.

Assume that Robert Jones left a message on VM system 140, the called party may access and play the stored message. The called party may compose a broadcast message to respond to one or more stored voicemail messages (act 550). For example, assume that the called party accesses a stored message using a telephone. The called party may play the stored message by, for example, speaking "Play, Robert Jones." After the stored message has been played, the called party may compose a broadcast message by speaking in response to a prompt and/or by depressing keys on a keypad. For example, the called party may record the contents of a broadcast message by speaking into a handset of called device 120. VM system 140 may store the broadcast message contents until the message is sent. In some implementations, the message may be converted to a digital format prior to storing.

The broadcast message may operate as a reply to the stored message and may include an answer to the stored message. A called party may then select recipients, such as broadcast parties, for the broadcast message by making a keypad selection and/or by speaking a command into a handset. For example, VM system 140 may present the called party with a list of broadcast party names that can be used to identify potential recipients of a broadcast message. When the called party selects recipients for the broadcast message, database 300 may associate an identifier with the selected names.

Database 300 may further associate the selected identifiers with the broadcast message. Certain broadcast parties may be subscribers of VM system 140 while other broadcast parties may not be subscribers of VM system 140. For example, co-workers of a called party may be subscribers or users affiliated with VM system 140 used by the called party at his/her place of employment. In contrast, friends of the called party may not be subscribers of the voicemail system used by the called party at his/her place of employment (e.g., VM system 140).

Assume that a stored voicemail message is an invitation to attend an event. A broadcast message that is generated in response to the stored message can include an RSVP as well as including other information, such as a request for directions, a question about suitable attire, and/or a request for additional details about the event. The broadcast message may be sent to the calling party, such as Robert Jones, and to another party that is associated with database 300. For example, a broadcast message may be sent to Robert and to Robert's wife, who may be helping Robert with planning the event.

A broadcast message may be configured to match a protocol and/or format used for the stored message. Assume that a calling party leaves a PSTN compatible voicemail message on VM system 140. Further assume that the called party composes a broadcast message that is compatible with a PSTN. The broadcast message may be configured to provide a voice response to a PSTN device associated with the calling party and another party.

A broadcast message may also be configured to include multiple formats. For example, in response to a PSTN voicemail message, a called party may generate a broadcast message that is compatible with a PSTN and an IP network. The called party may send the broadcast message to the calling party in a PSTN format and to the other party in an IP network compatible format. Implementations consistent with the principles of the invention are not limited to any particular type and/or format of broadcast message. In addition, broadcast messages may be sent to a calling party and any number of other parties using one or more formats for the broadcast message.

After generating the broadcast message, the called party may send the broadcast message to the calling party and at least one other party (act 560). For example, the called party may indicate, via, for example, a voice input, that the broadcast message should be sent to Robert Jones and Jane Smith. VM system 140 accesses database 300 and may identify the appropriate identifier in field 310 and format in field 350 and forwards the broadcast message to both Robert Jones and Jane Smith. Alternatively, the called party may provide a voice input of "Book Club." VM system 140, using speech recognition software, identifies the voice input and accesses database 300 to identify parties having an association in field 330 of "Book Club." In this example, VM system 140 identifies first entry 302 and second entry 304 as having an association field 330 storing "Book Club." VM system 140 identifies the recipients of the broadcast message as Robert Jones and Jane Smith. Using association field 330 allows the called party a simplified way in which to identify recipients of broadcast messages and also saves time with respect to identifying recipients. Recipients of broadcast messages may be subscribers of VM system 140 along with the called party. Alternatively, recipients of broadcast messages may not be subscribers of VM system 140. Broadcast messages may also include features, such as return receipts, lifetime indicators that cause the broadcast message to be deleted if it is not read within a determined time interval, and/or keys to facilitate decryption of encrypted broadcast messages. Broadcast messages may also include links to other information, such as a universal resource locator (URL) associated with a networked device.

The called party may compose and/or send a broadcast message at any time during the review and/or playback of stored voicemail messages on VM system 140. For example, the called party may compose and send a broadcast message without listening to a stored message, may compose and send a broadcast message after listening to a portion of a stored message, and/or may compose and send a broadcast message after listening to an entire stored message. In addition, the called party may send broadcast messages to all broadcast parties associated with database 300 and/or to a subset of the broadcast parties associated with database 300.

For example, assume that a first coworker leaves a voicemail message for the called party about a meeting. Further assume that in response to the voicemail message, the called party may send a broadcast reply to the first coworker as well as to a second and/or third coworker even if the second and/or third coworker did not leave voicemail messages and/or may not be calling parties. The called party may also send the broadcast message to a party that is not associated with database 300. For example, a called party may manually enter identifying information for a recipient of a broadcast message if that recipient does not have identifying information stored in database 300.

Broadcast messages may allow a called party to merge a first stored message with another stored message. Assume that a called party receives a first voicemail message from a first calling party and a second voicemail message from a second calling party. Further assume that the first voicemail message includes only speech data while the second voicemail, message includes speech data and alphanumeric data about a web site, such as a URL. The called party may listen to a portion of the first voicemail message and/or a portion of the second voicemail message. The called party may want to send a first broadcast message to the first calling party and to another party. The broadcast message may contain a reply to the first voicemail message as well as the URL that was received via the second voicemail message. The called party may include the URL in the broadcast message by copying the URL from the second voicemail message to the first broadcast message. The first broadcast message may be sent to the first calling party and to another party.

The processing described above assumes that the called party retrieves his/her messages via the user device associated with the called number (i.e., called device 120 in the example above). In alternative implementations, the called party may retrieve his/her messages via any user device that can access VM system 140. For example, the called party may retrieve messages left for him/her at his/her home telephone number using a wireless telephone or by using a telephone device at another location, such as his/her office.

The processing described above was directed to interactions between a PSTN device and VM system 140. Implementations consistent with the principles of the invention may also be web-based. In a web-based implementation, the party at called device 120 may enter an Internet address associated with VM system 140. For example, a called party using a web-based implementation may press one or more characters and/or function keys associated with a keyboard on called device 120 to retrieve the list of callers who have left messages. The retrieved list may be presented to the called party via a visual display that includes information identifying the callers who left messages.

Web-based implementations may operate with software modules to provide the called party with capabilities needed to access stored messages, obtain information about stored messages, select a stored message, compose a broadcast message and/or send a broadcast message. For example, a user interface may operate in conjunction with an information component that causes a pop up window to appear on a monitor associated with called device 120. The pop up window may provide information about stored messages, such as names of callers, identifiers associated with callers, the length of stored messages associated with respective callers and/or formats associated with stored messages. The displayed information may have been determined using an identity component to identify one or more calling parties associated with stored messages. A selection component may let the called party select a message using, for example, an input device without having to listen to the stored message. A composition component may let the called party compose a broadcast message using, for example, a keyboard and/or speech recognition software. A distribution component may operate to send the broadcast message to substantially any number of destinations. Destinations may include calling parties and non-calling parties. Web-based implementations may adapt broadcast messages to be compatible with various types of destinations, such as PSTN compatible destinations, IP compatible destinations and/or destinations having still other compatibilities.

The embodiments described above assume that directory server 160 stores a name corresponding to the identified telephone number. If however, directory server 160 does not store a name corresponding to the identified telephone number (e.g., the telephone number is unlisted), VM system 140 may provide the telephone number from which the call originated to the called party, as opposed to a name. The called party may compose and send a broadcast message to the identified telephone number even if the called party does not know the true identity of the caller.

EXAMPLE

FIGS. 6A-L illustrate exemplary aspects of a user's interaction with VM system 140 consistent with the principles of the invention. FIGS. 6A-L are directed to interactions between a called party and an IP-based telephone implementation that includes a display device to facilitate called party interactions with VM system 140. Interactions between a called party and a PSTN-based telephone are also presented in conjunction with the IP-based telephone implementation of FIGS. 6A-L.

A calling party may leave a message for a called party as described in connection with FIG. 4. The called party may pick up a handset associated with a telephone having a display device, associated therewith.

Figure 6A:
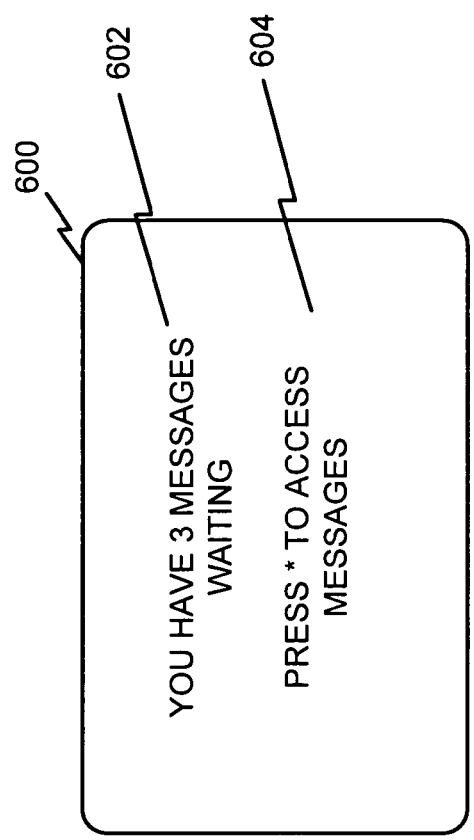

FIG. 6A illustrates an exemplary display 600 that can be used with implementations of a telephone device to facilitate called party interactions with VM system 140. Display 600 may present information to the called party about stored messages. For example, the called party may receive an audible indication via a handset and/or a visual indication via display 600 that one or more stored voicemail messages are available. Display 600 may include a message status portion 602 and an instruction portion 604. Message status portion 602 may indicate the number and/or type of messages waiting. For example, message status portion 602 may indicate that three messages are waiting for the called party. Instruction portion 604 may instruct the called party regarding the retrieval of information associated with the stored messages.

For example, instruction portion 604 may instruct the called party to depress "*" to retrieve information about stored messages. A PSTN-based implementation may provide the called party with a recorded message that says "Three messages are waiting. Press the star key to access the stored messages." The called party FIG. 6B illustrates database 610 that may include information about stored messages and broadcast parties. Broadcast parties may be calling parties and/or non-calling parties. For example, database 610 may include an ID field 612 to store identifiers associated with broadcast parties stored in database 610, a name field 614 to store names associated with parties stored in database 610, an association field 616 to store information about associations that can be assigned to parties identified in database 610, a location field 618 that can be used to associate geographic information with parties identified in database 610, and a format field 620 that can be used to associate format information with parties identified in database 610. For example, a broadcast party that is a calling party may be Robert Jones, and Robert Jones may be associated with a stored message in database 610.

in FIG. 68, Robert Jones is associated with a first stored message as noted by the number "1" on the left side of database 610, Jane Smith is associated with a second stored message, and Bill Lee is associated with a third stored message. In contrast, Sam Slade may be a broadcast party that is not associated with a stored message, as noted by the absence of a number along the left side of database 610 next to Sam Slade's phone number.

The called party may receive an audible instruction via the handset and/or a visual instruction via display 600 regarding selection of a stored message for playback. For example, in a PSTN-based or an IP-based telephone, a prompt may play through a handset that states "Press the number corresponding to a stored message to hear that message." The called party may depress "1" to cause VM system 140 to access the stored message from Robert Jones.

Figure 6C:
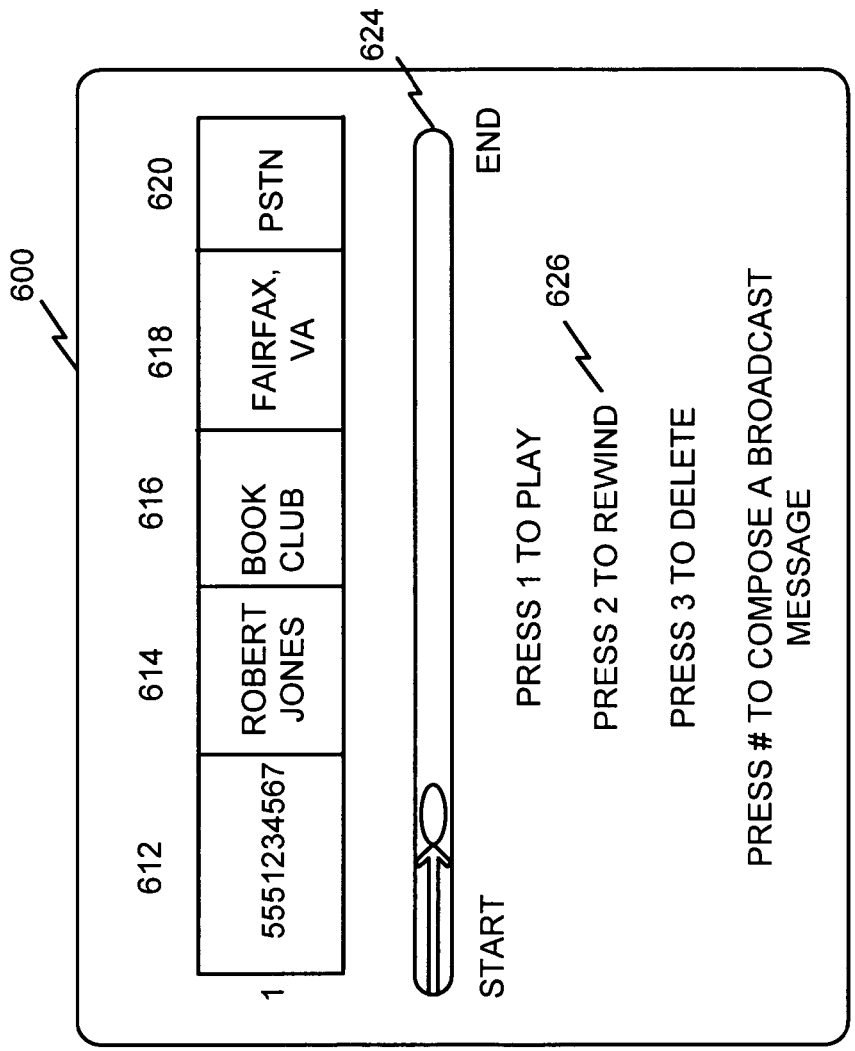

FIG. 6C illustrates an exemplary display that may result when the called party depresses a key to play a stored message. For example, information associated with a stored message from Robert Jones may be provided on display 600 and may include ID field 612, name field 614, association field 616, location field 618, and format field 620 that are associated with Robert Jones. In addition, display 600 may display a message length indicator 624, and an instruction field 626. For example, as shown in FIG. 6C, instruction field 626 may instruct the called party to press "1" to play the stored message, "2" to rewind the message, "3" to delete the message, and "#" to compose a broadcast message.

A selected message may play through the telephone handset, a speaker associated with the telephone, and/or may be displayed on display 600 in cooperation with a speech-to-text application. The called party may depress a button on a keypad, or speak an instruction, to access further features of VM system 140. For example, the called party may depress "#" while the message is playing to compose a broadcast message. With a PSTN-based telephone, VM system 140 may play "The stored message is from Robert Jones and was received from 555-123-4567. Robert is a member of the book club group, Robert is associated with a location of Fairfax Va., and Robert is associated with a PSTN format. Depress '1' to play the stored message, depress '2' to rewind the stored message, depress '3' to delete the stored message, or depress '#' to compose a broadcast message."

The called party may depress "#" to compose a broadcast message. Depressing "#" may cause a broadcast message display to be provided. The broadcast message display may provide the called party with information useful to compose a broadcast message. The called party may compose a broadcast message by entering information via a keypad or keyboard. Alternatively, the called party may compose a broadcast message by speaking into a handset or microphone. In some implementations, the spoken input may be recorded or converted to text via a speech-to-text application operating in conjunction with VM system 140.

Figure 6D:
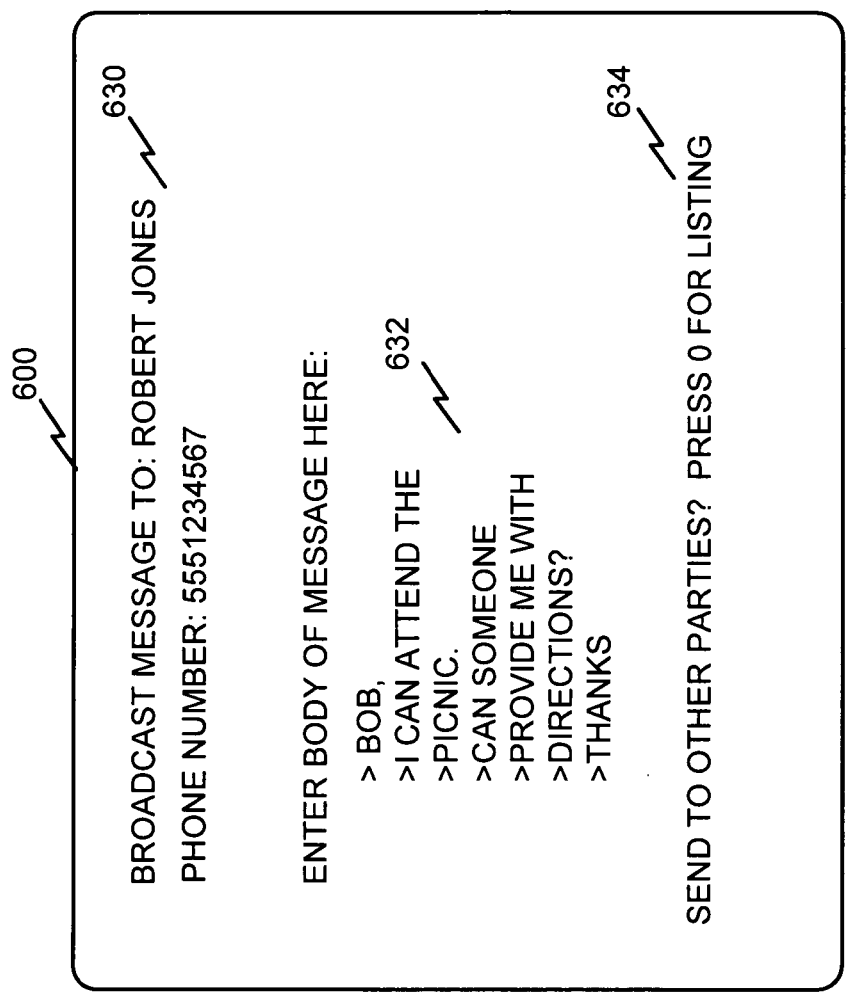

FIG. 6D illustrates an exemplary display 600 that can provide the called party with information about a broadcast message. Display 600 may include a destination portion 630, a message body portion 632 and an options portion 634. Destination portion 630 may include information identifying the party that will receive the broadcast message. For example, the name and telephone number of Robert Jones may be displayed in destination portion 630. Message body portion 632 may include information associated with the body of the broadcast message. For example, text may be displayed in message body portion 632 as the called party composes a broadcast message. Options portion 634 may include information that lets the called party make selections regarding other actions that may be performed in conjunction with the composed broadcast message. For example, options portion 634 may let the called party specify another recipient for the broadcast message. A recipient specified via options portion 634 may be in addition to the recipient identified in destination portion 630. The recipient specified in options portion 634 may be another calling party, such as Jane Smith or Bill Lee, or may be a non-calling party, such as Sam Slade (FIG. 6B).

With a PSTN-based telephone, VM system 140 may provide voice prompts to the called party via a handset. For example, in conjunction with FIG. 6D, the called party may hear "Robert Jones is the recipient of the broadcast message and his telephone number is 555-123-4567. The recorded broadcast message is 'Bob, I can attend the picnic. Can someone provide me with directions? Thanks.' Press 0 to hear a list of other parties that can be added as broadcast message recipients." The called party may depress "0" to select options portion 634 (FIG. 6D). The called party may be provided with information about other potential recipients of the broadcast message.

Figure 6E:
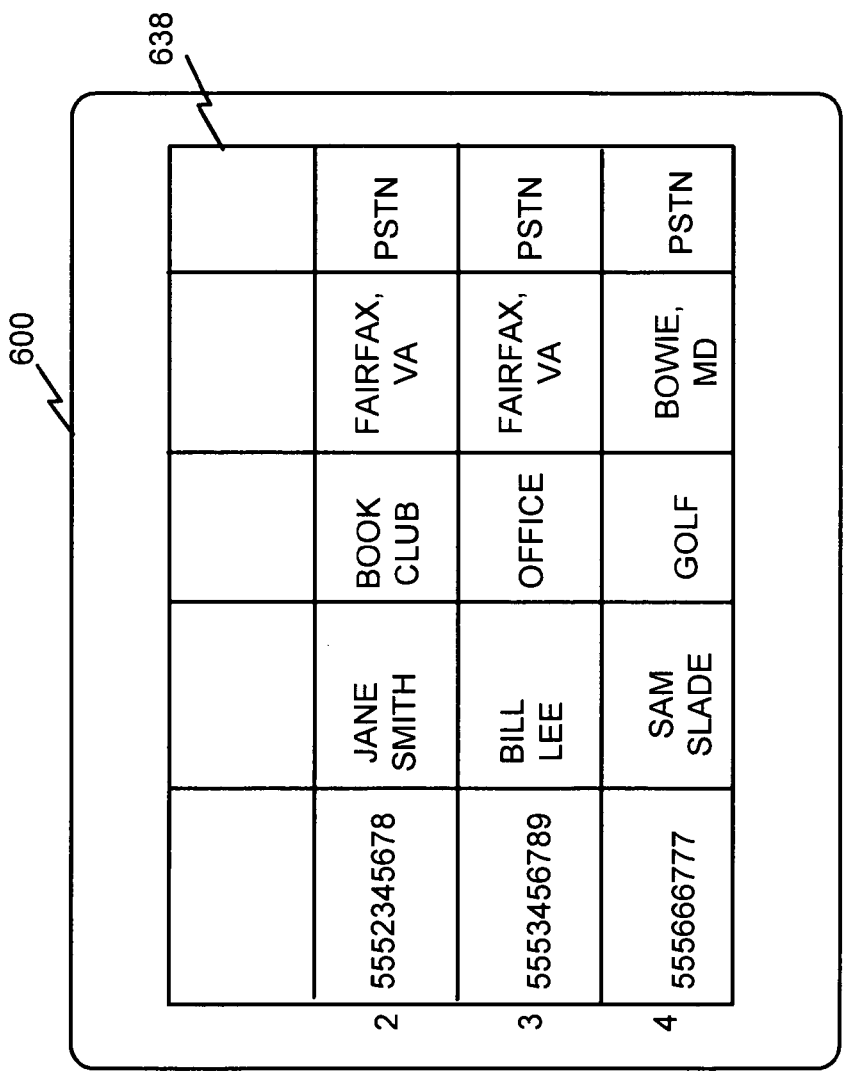

FIG. 6E illustrates information associated with a database 638 that can be provided to a called party in response to selecting options portion 634 (FIG. 6D). Database 638 may include a portion of the contents of database 610. For example, database 638 may include information associated with broadcast parties that have not been associated with the composed broadcast message.

The called party may select an entry from database 638 by depressing a keypad button corresponding to a number along the left side of database 638. For example, the called party may read display 600 and may select Jane Smith by depressing "2", Bill Lee by depressing "3" and/or Sam Slade by depressing "4," With a PSTN-based telephone, the called party may be provided with a voice prompt. For example, the called party may hear "Press '2' to select Jane Smith as a recipient, press '3' to select Bill Lee as a recipient, or press '4' to select Sam Slade as a recipient." The called party may depress "2" to select Jane Smith in response to the display of FIG. 6E and/or a voice prompt associated therewith.

Figure 6F:
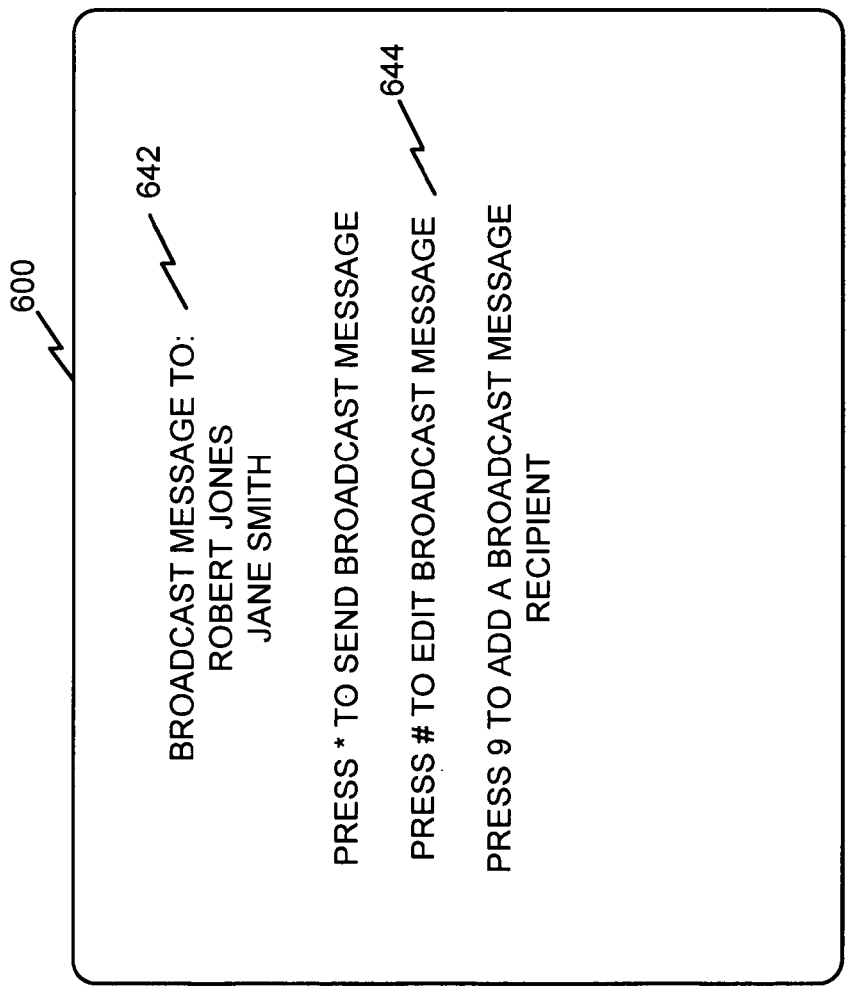

FIG. 6F illustrates exemplary fields that may be displayed in response to the called party's actions associated with FIG. 6E. For example, a first information field 642 may indicate that Jane Smith was added as a second recipient for the broadcast message. A first instruction field 644 may provide the called party with instructions for sending the broadcast message to Robert Jones and Jane Smith and/or for editing the broadcast message. For example, depressing "*" on a keypad may send the broadcast message, while depressing "#" on a keypad may cause an editing window to be displayed on display 600.

With a PSTN-based telephone, the called party may be provided with voice prompts. For example, the called party may hear "The broadcast message will be sent to Robert Jones and Jane Smith. Press to send the broadcast message now, press '#' to edit the broadcast message, or press '9' to add an additional broadcast message recipient."

The called party may depress "*" on a keypad to send the broadcast message to Robert Jones and Jane Smith. Depressing "*" in connection with FIG. 6F ma cause additional information to be displayed to the called party.

FIG. 6G illustrates an exemplary display field 648 that may be provided to the called party in response to depressing "*" in connection with FIG. 6F. For example, display field 648 may inform the called party that the broadcast message was sent to Robert Jones and Jane Smith and that the called party did not request delivery confirmation. With a PSTN-based telephone, the called party may be provided with an audible message. For example, VM system 140 may play "The broadcast message has been sent to Robert Jones and Jane Smith. You did not request a delivery confirmation for this broadcast message."

Implementations consistent with the principles of the invention may let the called party perform additional actions, such as sending broadcast messages to groups and/or subsets of groups. For example, when the called party depressed "0" in connection with FIG. 6D, the called party was able to access database 638. In conjunction with information in database 638, the called party may have been presented with a display that included information about groups, such as a book club group.

Figure 6H:
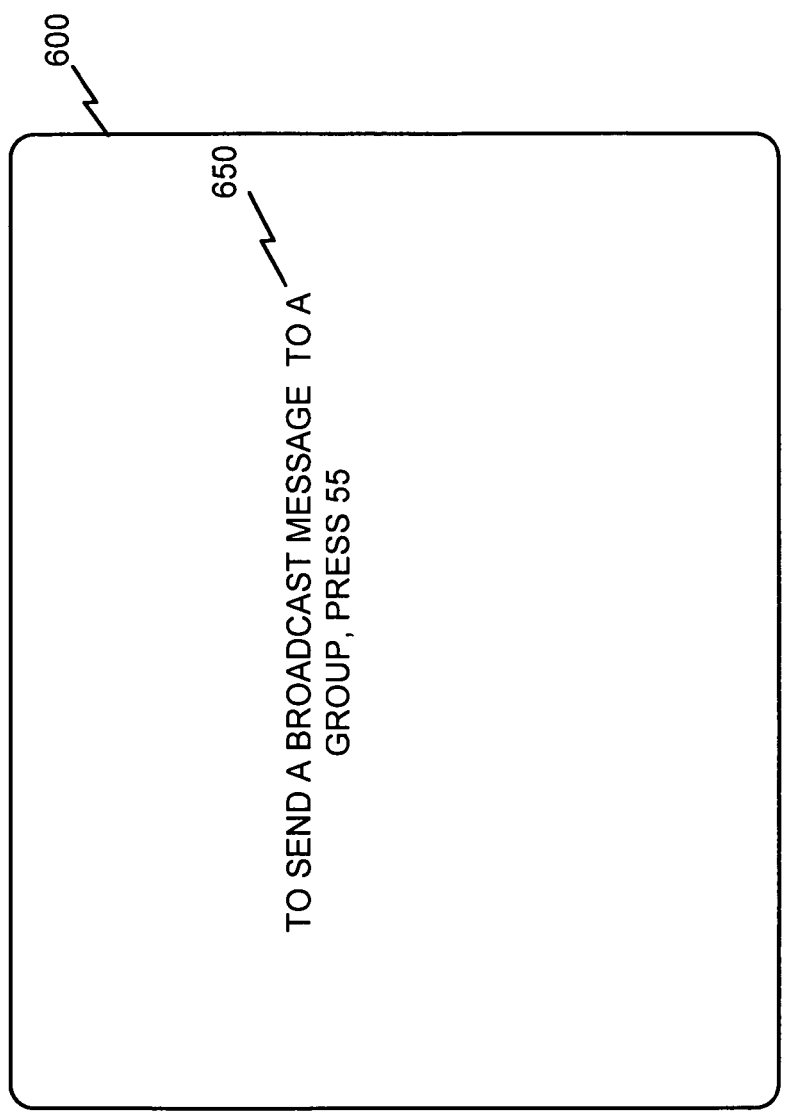

FIG. 6H illustrates an exemplary display 600 that may be provided to the called party to inform the called party about available groups of broadcast message recipients. Group field 650 may provide the called party with instructions for sending a broadcast message to a group of recipients. With a PSTN-based telephone, the called party may be provided with audible instructions. For example, VM system 140 may play "Press '55' to send a broadcast message to a group." The called party may depress "55" on a keypad. In response to "55", the called party may be provided with information about groups that are stored in VM system 140.

Figure 6I:
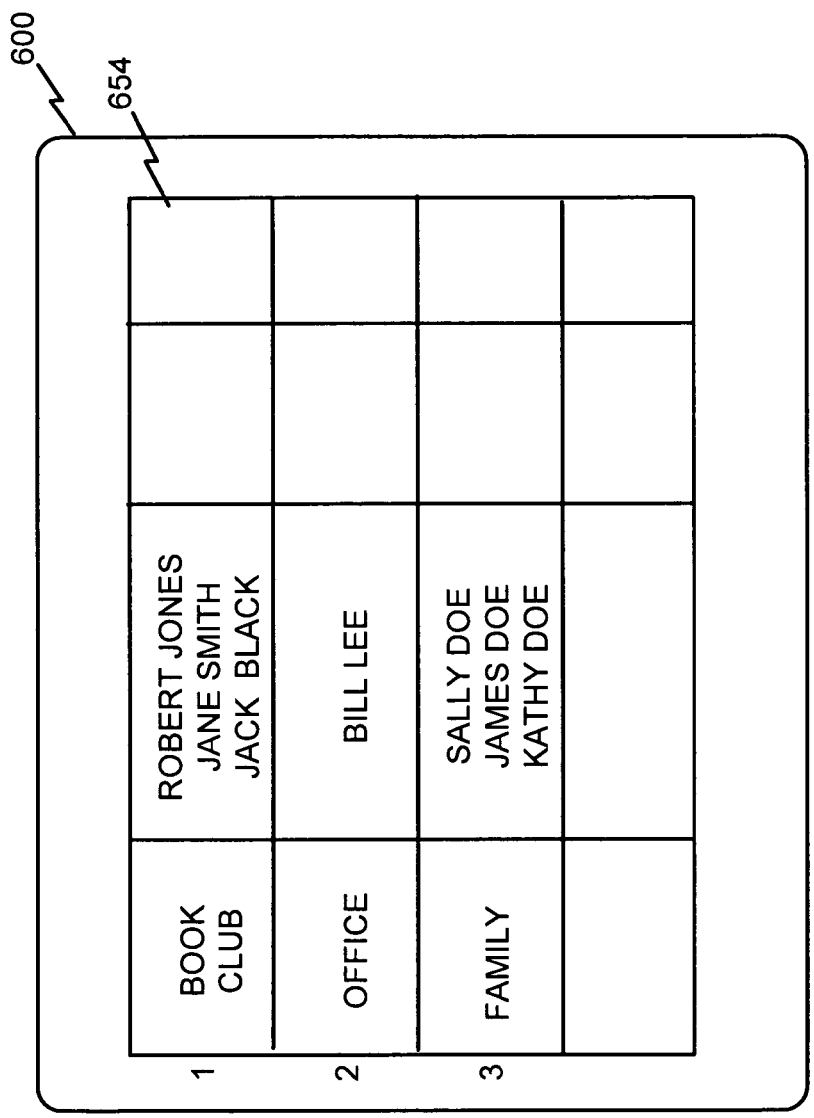

FIG. 6I illustrates an exemplary display that may be provided to the called party in response to depressing "55" in connection with FIG. 6H, above. For example, group database 654 may be provided to the called party via display 600. Group database 654 may include a portion of the contents of database 610. For example, group database 654 may identify groups and broadcast parties included within those groups.

Entries in group database 654 may be arranged by, for example, organizations, such as a book club, an office, and/or a family. Each organization may have one or more names associated therewith. For example, the book club may have Robert Jones, Jane Smith and Jack Black associated therewith. Entries associated with group database 654 may be selected by, for example, depressing a keypad digit that corresponds to a number along the left side of group database 654. For example, the called party may select the book club group by depressing "1" on a keypad. With a PSTN-based telephone, VM system 140 may play "Press '1' to select the book club group, press '2' to select the office group, or press '3' to select the family group." Depressing "1" may cause a book club listing to be displayed on display 600.

FIG. 6J illustrates an exemplary book club listing 658 that may include information about members of the book club. For example, book club listing 658 may include the names of members associated with the book club. In addition, book club listing 658 may include a status field that lets the called party select some or all of the names within the book club as recipients of a broadcast message. For example, book club listing 658 may identify Robert Jones and Jane Smith as being selected to receive a broadcast message and Jack Black as not being selected to receive the broadcast message. If the called party wants to change the status of Jack Black to "selected," the called party may depress a keypad button that corresponds to a number associated with Jack Black's entry, here the number "3."

With a PSTN-based telephone, the called party may be provided with audible information about book club listing 658. For example, VM system 140 may play "Robert Jones and Jane Smith are selected to receive a broadcast message and Jack Black is not selected to receive the broadcast message. Press '3' to select Jack Black" The called party may depress "3" to access information that can be used to change the status associated with Jack Black in book club listing 658. For example, depressing "3" may toggle Jack Black's status from "not selected" to "selected."

Figure 6K:
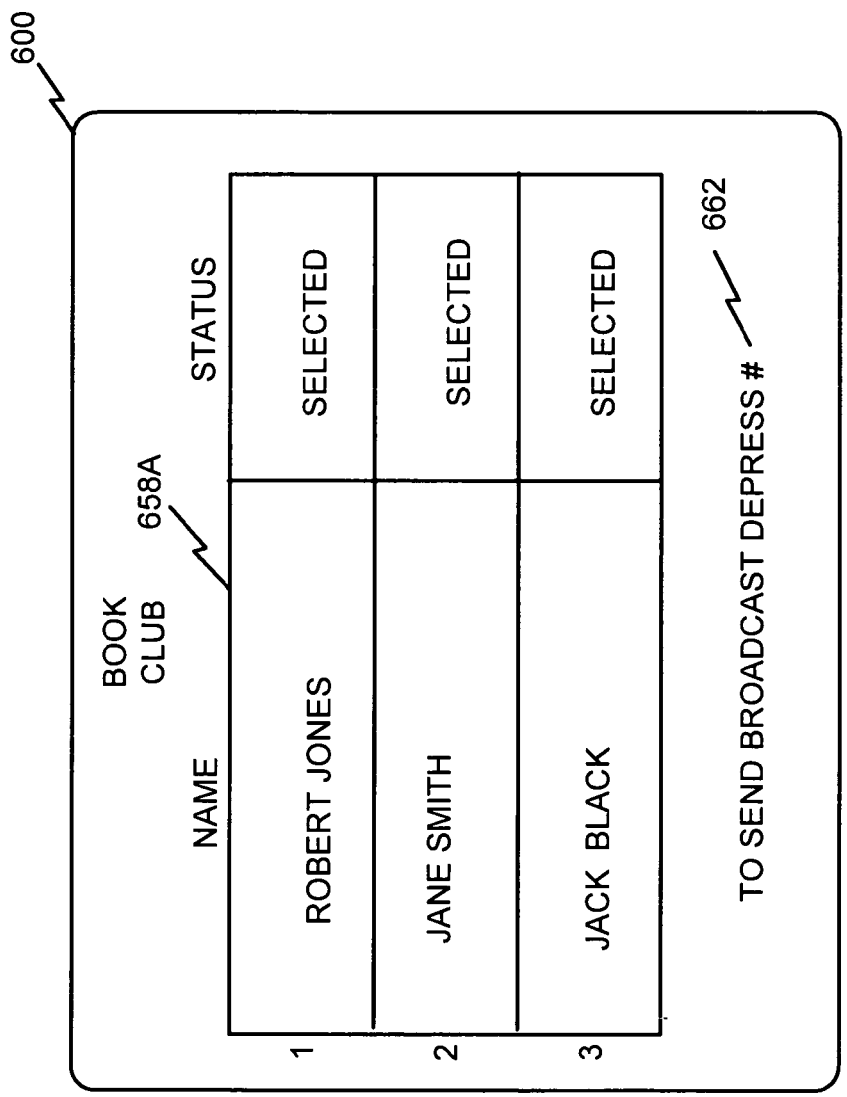
Figure 6L:
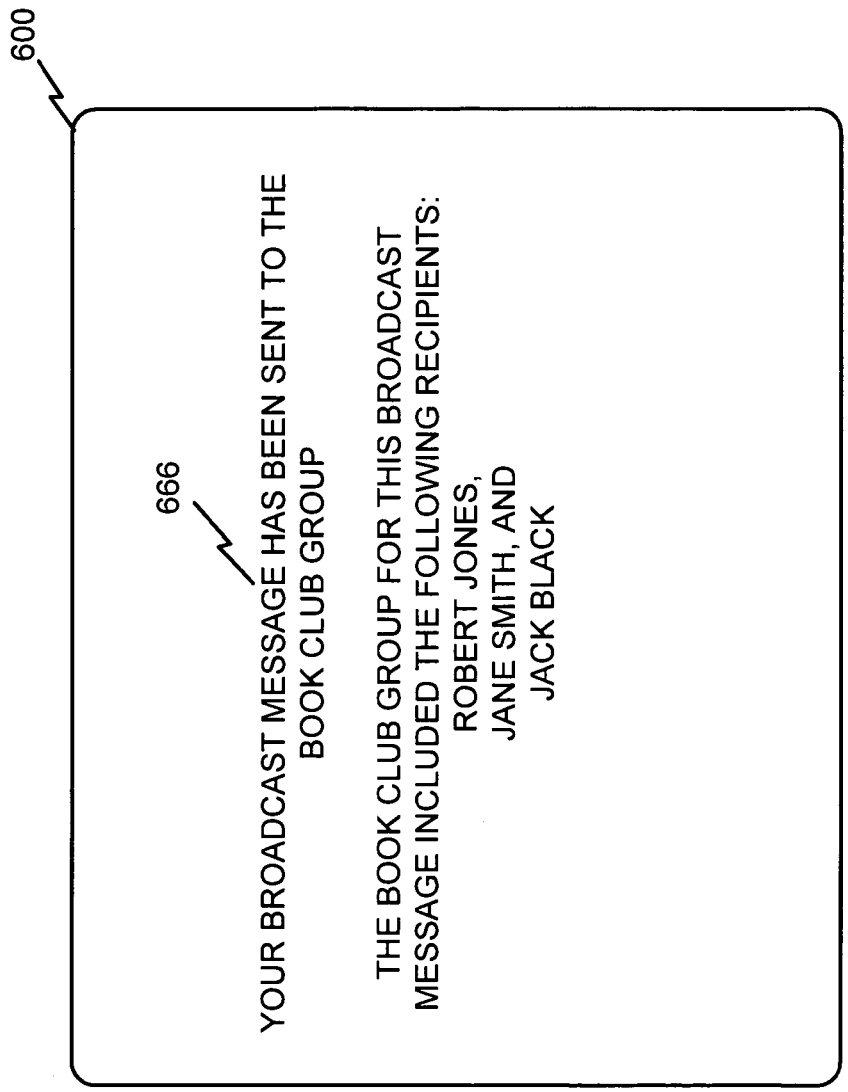

FIG. 6K illustrates an exemplary display 600 that may be provided to the called party in response to depressing "3" in conjunction with book club group listing 658. The display associated with FIG. 6K may also include an instruction field 662 to instruct the called party with respect to sending the broadcast message to the book club group. For example, depressing "#" may send the broadcast message to Robert Jones, Jane Smith and Jack Black. In response to depressing "#", the called party my receive a confirmation 666 (FIG. 6L) that the broadcast message was successfully sent to the selected members of the book club group, namely Robert Jones, Jane Smith and Jack Black.

With a PSTN-based telephone, the called party may be provided with audible information. For example, VM system 140 may play "Jack Black has been selected. Press '#' to send the broadcast message to Robert Jones, Jane Smith, and Jack Black." If "#" is depressed by the called party, VM system 140 may broadcast the message to the selected parties and play "The broadcast message has been sent to Robert Jones, Jane Smith, and Jack Black."

In one implementation, a PSTN based telephone may be used to retrieve stored messages, select broadcast reply recipients, compose broadcast replies and send broadcast replies to one or more calling parties. For example, a number of calling parties may leave messages for a subscriber of VM system 140. The subscriber may receive a MWI via a handset to notify the subscriber that stored messages are available on VM system 140. The subscriber may access VM system 140 by calling a telephone number associated with VM system 140.

The subscriber may receive a prompt from VM system 140 after providing, for example, authentication information, such as a password. The prompt may tell the subscriber that stored messages are available. For example, VM system 140 may play "You have four stored messages. Press '1' to hear stored messages in the order in which they were received. To associate a stored message with a broadcast reply, depress '2' while the respective message is playing. To associate all stored messages with a broadcast reply, depress '3' at any time".

The subscriber may depress "1" to hear messages in the order in which they were received. For example, the subscriber may hear "Message one is from Jane Smith", and then the message from Jane Smith may be played for the subscriber. The subscriber may depress "2" during the playback of the message from Jane Smith to associate Jane Smith as a broadcast reply recipient. The subscriber may depress "2" during the playback of a second message to associate, for example, Jack Black as a second broadcast reply recipient. The subscriber may listen to the third and fourth messages and may opt not to select the respective calling parties as broadcast reply recipients by not depressing any keys during the playback of those messages.

The subscriber may be prompted to create a broadcast reply or to select a stored broadcast reply after listening to the stored messages. For example, after the fourth message has finished playing, the subscriber may hear "Please begin speaking after the tone to generate a broadcast reply and depress the '#' key when finished to store the broadcast reply. To re-record your broadcast reply depress '*' and then depress '#' when you are finished speaking. Depress '4' to hear a listing of stored broadcast replies". The subscriber may hear the tone and may speak "Hi this is Tom and I am on vacation until Thursday. I will return your call when I return". The subscriber may depress "#" when finished speaking to store the broadcast reply on VM system 140.

After the broadcast reply is stored on VM system 140, the subscriber may receive a prompt that plays "Depress '5' to send your broadcast reply to Jane Smith and Jack Black". The subscriber may depress "5" to send the broadcast reply to Jane Smith and Jack Black. As discussed above, implementations consistent with the principles of the invention may allow a subscriber to send a broadcast reply to substantially any number of recipients using, a single action, such as by depressing a single button on a keypad of a PSTN telephone device.

CONCLUSION

Implementations consistent with the invention provide a voicemail service that provides identifiers associated with stored voice messages. This allows a subscriber to quickly identify the parties who have left messages. In addition, implementations consistent with the invention allow the subscriber to retrieve the messages in his/her preferred order regardless of the order in which the messages were received. Furthermore, implementations consistent with the principles of the invention may allow the subscriber to send broadcast messages to a number of recipients.

The foregoing description of exemplary implementations of the invention provides illustration and description, but is not intended to be exhaustive or to limit the invention to the precise form disclosed. Modifications and variations are possible in light of the above teachings or may be acquired from practice of the invention. For example, calling parties may be prompted to speak their names, as described above, instead of or in addition to, using directory server 160 to identify a name associated with a calling party. The spoken name may then be stored with the stored voicemail message.

In addition, while series of acts have been described with respect to FIGS. 4 and 5, the order of the acts may be varied in other implementations consistent with the invention. Further, acts being described as being performed by one device above may be performed by other devices in implementations consistent with the invention. Moreover, non-dependent acts may be implemented in parallel.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code, it being understood that one of ordinary skill in the art would be able to design software and control hardware to implement the aspects based on the description herein.

Further, certain portions of the invention may be implemented as "logic" that performs one or more functions. This logic may include hardware, such as an application specific integrated circuit or a field programmable gate array, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   receiving a call from a calling party directed to a called party and storing a message from said call in a voicemail system to which said called party is a subscriber and in which a plurality of messages for said called party from previous calling parties was previously stored;
   providing said called party access to said voicemail system;
   providing said called party with information about, or identities of, said calling party and said previous calling parties;
   said called party, based on said information or said identities, selecting any one of said calling party and said previous calling parties to obtain a selected reply message recipient;
   said called party composing a broadcast message addressed to said selected reply message recipient and to at least a subset of said previous calling parties, said selected reply message recipient and said at least said subset together comprising broadcast parties;
   sending said broadcast message to said broadcast parties selected from the group of broadcast parties consisting of a calling party who is a subscriber to said voicemail system, a calling party who is not a subscriber to said voicemail system, a non-calling party who is a subscriber to said voicemail system and a non-calling party who is not a subscriber to said voicemail system; and
   merging a first message stored in said voicemail system with a second message stored in said voicemail system during said composing said broadcast message.

2. The method of claim 1 further comprising:
   providing said called party with options for retrieving, in any order, said calling party message and said previously stored plurality of messages.

3. The method of claim 2 wherein said calling party message and said plurality of messages were stored in said voicemail system in a particular sequential order, said method further comprising:
   providing said called party with options for consecutively sending a different version of said broadcast message to a respectively different broadcast party in substantially any sequential order and without being constrained to said particular sequential order.

4. The method of claim 1 further comprising:
   obtaining said information or said identities from a database located within, or external to, a directory server networked with said voicemail system.

5. The method of claim 4 wherein said database is located external to said directory server and internal to said voicemail system.

6. The method of claim 4 further comprising:
   providing, in said database, an identification field, a name field, an association field, a location field, a format field and a preference field.

7. The method of claim 6 wherein said identification field is selected from the group of identifiers consisting of IP addresses, email addresses, telephone numbers and SIP user names, as entries in said identification field to identify said previous calling parties.

8. The method of claim 7 wherein said name field stores name information associated with said identifier used in said identification field, said name information including a name to whom a corresponding said identifier has been registered or assigned by a service provider.

9. The method of claim 6 wherein said association field includes information associating together a number of entries of said database based on commonality of said number of entries.

10. The method of claim 6 wherein said location field stores geographic information associated with a name in said name field and/or said identifier in said identification field.

11. The method of claim 6 wherein said format field includes information that identifies a communication format including a communication protocol or a networking protocol used to send said broadcast message from said voicemail system.

12. The method of claim 11 wherein said broadcast message is sent to a first message recipient in a PSTN format and to a second message recipient in an IP network format including, but not limited to, an instant message format.

13. The method of claim 6 wherein said preference field includes information for identifying one or more communication preferences associated with said selected reply message recipient, said preferences including preference entries listed in a hierarchy.

14. The method of claim 13 wherein said preference entries include PSTN, pager and email and further include a time-of-day entry indicating when to send said broadcast message to said selected reply message recipient.

15. The method of claim 14 wherein said preference entries further include a lifetime preference whereby if said broadcast message is not read by said selected reply message recipient within a predetermined time equal to said lifetime preference, then said broadcast message is deleted from an inbox of said selected reply message recipient.

16. The method of claim 4 further comprising:
   permitting said called party to associate priority information with a list of potential calling parties and to further specify a priority for each calling party stored in said database.

17. The method of claim 4 further comprising:
   said called party sending said broadcast message to an identified telephone number associated with a particular calling party if true identity of said particular calling party is not known.

18. The method of claim 1 wherein said providing said called party access further comprises:
   entering a telephone number associated with said voicemail system into a telephone used by said called party.

19. The method of claim 18 further comprising:
requesting an authorization code from said called party which said called party must supply prior to being given access to stored voicemail messages associated with calls to said called party.

20. The method of claim 1 wherein said providing said called party access further comprises:
entering one or more pre-designated characters associated with said voicemail system into a telephone used by said called party.

21. The method of claim 18 or 20 further comprising:
providing, via said telephone and responsive to said entering, said called party with said information in human-generated speech or in machine-generated speech.

22. The method of claim 21 wherein said provided said information includes a greeting, a time/date stamp for the message, a length of the message and a priority for the message.

23. The method of claim 22 wherein said greeting also identifies the number and/or type of stored messages awaiting said called party.

24. The method of claim 1 wherein said providing said called party with said information comprises:
supplying, via a telephone with a display area or via a computer display device, said called party with a visible display identifying calling parties who left messages in said voicemail system.

25. The method of claim 1 wherein said providing access further comprises:
employing speech recognition software within said voicemail system to process spoken responses from said called party.

26. The method of claim 1 further comprising:
providing said called party with an option to have said voicemail system translate said broadcast message from an incompatible format to formats compatible with said broadcast parties.

27. The method of claim 1 further comprising:
configuring said broadcast message to include multiple formats so that said called party can generate a broadcast message compatible with both PSTN and an IP network and can send said broadcast message to both a first calling party in PSTN and a second calling party in IP format.

28. The method of claim 1 further comprising:
including a lifetime indicator in said broadcast message to cause said broadcast message to be deleted if not read within a determined time interval.

29. The method of claim 1 further comprising:
supplying keys to facilitate decryption of encrypted broadcast messages.

30. The method of claim 1 wherein said first message includes only speech data and said second message includes speech data and website-related alphanumeric data.

31. A method, comprising:
sending a broadcast message from a called party to broadcast parties selected from the group of broadcast parties consisting of:
a calling party who left a message on, and is a subscriber to, a voicemail system to which said called party is a subscriber,
a calling party who left a message on, and is not a subscriber to, said voicemail system,
a non-calling party who is a subscriber to said voicemail system and who called said called party but has not left a message on said voicemail system,
a non-calling party who is not a subscriber to said voice mail system and who called said called party but has not left a message on said voicemail system, and
merging a first message stored in said voicemail system with a second message stored in said voicemail system while composing said broadcast message.

32. A method, comprising:
sending a broadcast message from a called party to broadcast parties selected from the group of broadcast parties consisting of a calling party who is a subscriber to a voicemail system to which said called party is a subscriber, and a calling party who is not a subscriber to said voicemail system; and
merging a first message stored in said voicemail system with a second message stored in said voicemail system while composing said broadcast message.

* * * * *